US009661263B2

(12) United States Patent
Chang et al.

(10) Patent No.: US 9,661,263 B2
(45) Date of Patent: May 23, 2017

(54) UNINTERRUPTIBLE POWER/CATV SIGNAL COUPLER

(71) Applicant: ZINWELL CORPORATION, New Taipei (TW)

(72) Inventors: Chien-Hsun Chang, New Taipei (TW); Tso-Feng Chang, New Taipei (TW)

(73) Assignee: ZINWELL CORPORATION, New Taipei (TW)

( * ) Notice: Subject to any disclaimer, the term of this patent is extended or adjusted under 35 U.S.C. 154(b) by 90 days.

(21) Appl. No.: 14/881,808

(22) Filed: Oct. 13, 2015

(65) Prior Publication Data

US 2016/0113140 A1 Apr. 21, 2016

(30) Foreign Application Priority Data

Oct. 15, 2014 (TW) .............................. 103218277 U

(51) Int. Cl.
*H04N 7/10* (2006.01)
*H01R 24/00* (2011.01)

(52) U.S. Cl.
CPC ................... *H04N 7/104* (2013.01)

(58) Field of Classification Search
None
See application file for complete search history.

(56) References Cited

U.S. PATENT DOCUMENTS

| 5,648,745 | A  | * | 7/1997 | Spriester  | H01R 9/0509 200/51.1 |
| 5,756,935 | A  | * | 5/1998 | Balanovsky | H01R 24/46 174/549 |
| 5,909,154 | A  | * | 6/1999 | Brown      | H04N 7/104 200/51.1 |
| 5,914,863 | A  | * | 6/1999 | Shen       | H01R 24/46 174/50 |
| 6,261,125 | B1 | * | 7/2001 | Yeh        | H01R 9/0509 348/E7.053 |
| 6,294,846 | B1 | * | 9/2001 | Hughes     | H01H 3/16 200/50.1 |
| 6,593,830 | B2 | * | 7/2003 | Wu         | H01R 24/46 333/100 |

(Continued)

*Primary Examiner* — Xanthia C Cunningham
(74) *Attorney, Agent, or Firm* — Chun-Ming Shih; HDLS IPR Services

(57) ABSTRACT

An uninterruptible power/CATV signal coupler includes a base, a cover, and a bridge connection device. The base forms an accommodation chamber. A cover is detachably connected to the base, and includes a circuit board and two sleeves. The sleeves are connected to one surface of the circuit board. The bridge connection device is contained inside the accommodation chamber and includes a first housing, a second housing, two conductive terminals inserted into the two sleeves respectively, two press elements pressed by the circuit board, a bridge connection element disposed between the first housing and the second housing, and two seesaw elements contact with the bridge connection element. The two seesaw elements are pivotally connected to the second housing. When the bridge connection element are elastically pressed by the press elements respectively, the bridge connection element is disconnected from the conductive terminals and contacts the base.

13 Claims, 6 Drawing Sheets

(56) References Cited

U.S. PATENT DOCUMENTS

| | | | | |
|---|---|---|---|---|
| 7,807,935 B2* | 10/2010 | Tang | ...................... | H01R 24/46 |
| | | | | 174/549 |
| 2006/0150232 A1* | 7/2006 | Karpati | ................. | H04N 7/104 |
| | | | | 725/127 |
| 2008/0107016 A1* | 5/2008 | Tang | ...................... | H01R 24/46 |
| | | | | 370/217 |
| 2015/0236460 A1* | 8/2015 | Ariesen | ................. | H04H 20/63 |
| | | | | 725/144 |
| 2016/0113140 A1* | 4/2016 | Chang | .................... | H04N 7/104 |
| | | | | 361/679.01 |
| 2016/0365686 A1* | 12/2016 | Lu | .......................... | H01R 24/38 |

\* cited by examiner

UNINTERRUPTIBLE POWER/CATV SIGNAL COUPLER

TECHNICAL FIELD

The present invention relates to a directional coupler and, in particular, to an uninterruptible power/signal coupler which prevents power/CATV signal interruption during cover changes for maintenance service.

BACKGROUND

Cable television is a system in which signals from stations are converged toward a main station as a center. The signals from stations are gathered together at the main station which functions as a transmitter, then the converged signals (so called the primary signals) are delivered to a local network via a transmission cable, and signal couplers are connected to a primary signal transmission cable to deliver signals to clients (paying subscribers).

At present, when opening a cover of the conventional signal coupler for maintenance purpose, power supply and signals are interrupted, so the paying subscribers cannot watch the television programs well, which is a main shortcoming of the conventional signal coupler. There is already an uninterruptible signal coupler in the market, which prevents disconnection between the power/signal input end and the power/signal output end when the cover is opened for repairing/replacing a circuit board or other components; however, it is not easy to make accurate alignment in the structure, so signal transmission problem occurs.

SUMMARY

It is an object of the present invention to provide an uninterruptible power/signal coupler, which prevents power/CATV signal interruption during cover changes for maintenance service.

Accordingly, the present invention provides an uninterruptible power/CATV signal coupler, comprising:

a base provided with an accommodation chamber;

a cover detachably connected to the base, the cover including a circuit board and two sleeves, the sleeves being connected to one surface of the circuit board; and a bridge connection device contained inside the accommodation chamber, the bridge connection device including a first housing, a second housing connected to the first housing, two conductive terminals inserted into the two sleeves respectively, two press elements pressed by the circuit board, a bridge connection element disposed between the first housing and the second housing, and two seesaw elements in contact with the bridge connection element, wherein the two seesaw elements are detachably pivotally connected to the second housing, and when two ends of the bridge connection element are elastically pressed by the press elements respectively, the bridge connection element is disconnected from the conductive terminals and contacts the base.

In the uninterruptible power/CATV signal coupler, the bridge connection element further comprises a plurality of claws, the first housing includes a retaining groove, and each of the claws perpendicularly protrudes from an edge of the bridge connection element and is disposed corresponding to the retaining groove.

In the uninterruptible power/CATV signal coupler, the bridge connection element further includes two elastic portions, the elastic portions are disposed at two ends of the bridge connection element respectively for flexibly contacting the base, and the claws are disposed between the two elastic elements.

In the uninterruptible power/CATV signal coupler, each of the claws and the bridge connection element are integrally formed, and an end of each of the claws includes a bend portion.

In the uninterruptible power/CATV signal coupler, each of the seesaw elements further includes two pivot shafts, a tilt section, and a flat section, the second housing includes two pivot holes disposed corresponding to the two pivot shafts for engagement with the two pivot shafts, the tilt section and the flat section are disposed at two sides of the pivot shafts respectively, and the tilt section further tilts toward the end of the bridge connection element from the pivot shaft.

In the uninterruptible power/CATV signal coupler, the bridge connection element further includes two crease portions, the crease portions are disposed corresponding to the respective pivot shafts, when the bridge connection element is pressed by the press elements, the tilt section of the seesaw element is brought into a pressed position at the same time, the flat section rotates about the pivot shaft as an axis to tilt upward to push the bridge connection element so that each of the claws thereof protrudes into the retaining groove.

In the uninterruptible power/CATV signal coupler, when the bridge connection element is not pressed by the press elements, the tilt section of the seesaw element tilts up upon elastic restoration of the bridge connection element to an original position, and the flat section rotates back about the pivot shaft as an axis to contact the second housing of the bridge connection device, thereby enabling each of the claws of the bridge connection element to be detached from the retaining groove.

In the uninterruptible power/CATV signal coupler, the two seesaw elements further includes two flange plates respectively, and each of the flange plates is disposed upright at two sides of the flat section for positioning the bridge connection element.

In the uninterruptible power/CATV signal coupler, each of the two conductive terminals further includes a linking portion and a guiding pillar, the linking portion is disposed between the first housing and the second housing, the linking portion is engaged with the sleeve, a width of the guiding pillar is greater than a diameter of the linking portion, and the guiding pillar forms a plurality of through holes.

In the uninterruptible power/CATV signal coupler, a ratio of the diameter of the linking portion to the width of the guiding pillar is about 1:1.2 (1:1.33 is preferable).

In the uninterruptible power/CATV signal coupler, when the cover is detached from the base, the two ends of the bridge connection element are not pressed by the press elements, and the bridge connection element is elastically restored to an original position to contact a bottom of each of the two conductive terminals to make an electrical connection.

In the uninterruptible power/CATV signal coupler, wherein upon pressing one of the press elements at one side, the elastic element is disconnected from the conductive terminal (guiding pillar) to contact the base, and before contacting the base, the elastic element at the other side is also disconnected from the conductive terminal (guiding pillar).

The detailed description and specific embodiments provided below are intended for purposes of illustration only and are not intended to limit the scope of the present disclosure.

BRIEF DESCRIPTION OF THE DRAWINGS

The disclosure will become more fully understood from the detailed description and the drawings given herein below for illustration only, and thus does not limit the disclosure, wherein.

DETAILED DESCRIPTION

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

Figure 1:
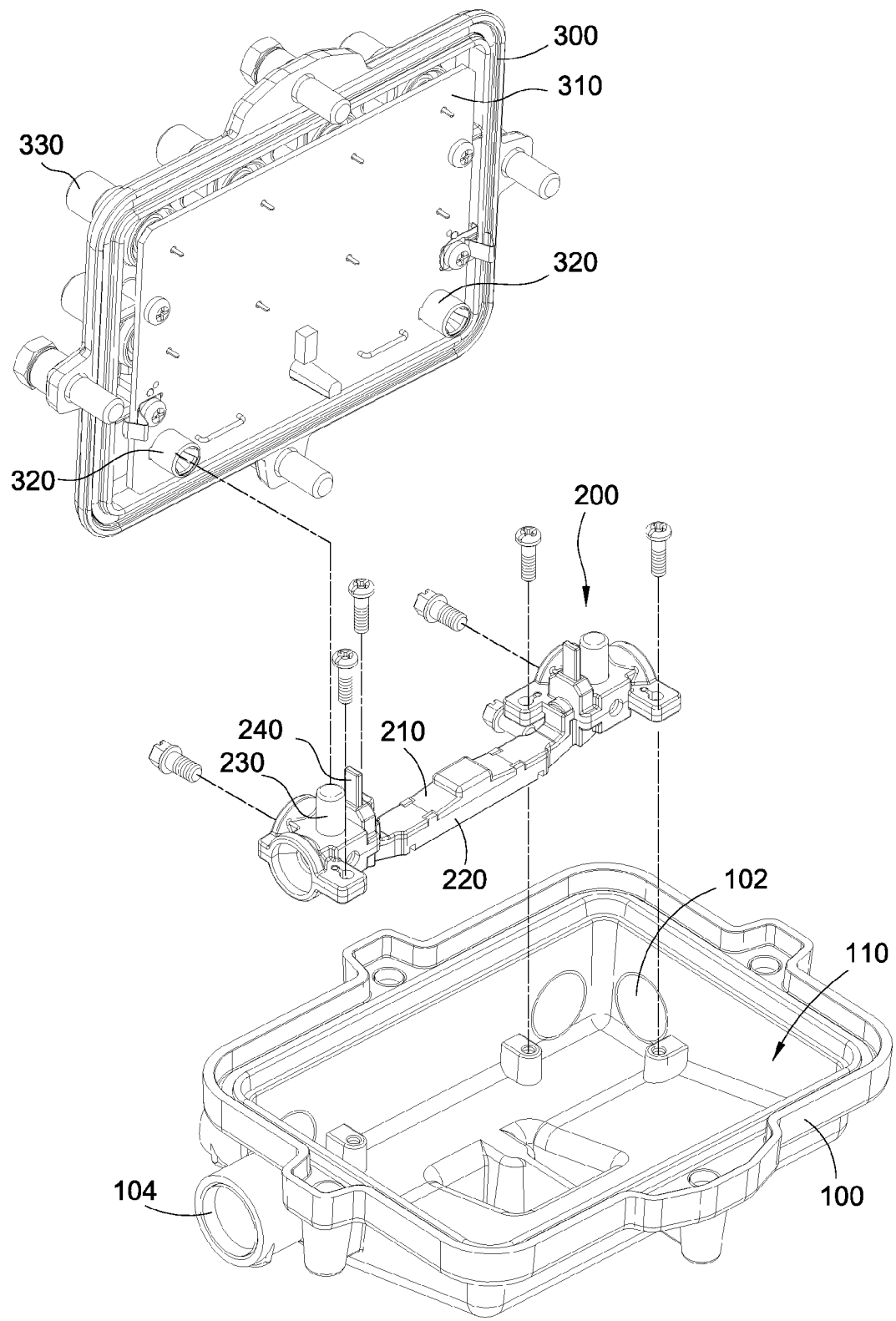
FIG. 1 is an exploded view of an uninterruptible power/CATV signal coupler of the present invention.

Please refer to FIG. 1 which is an exploded view of an uninterruptible power/CATV signal coupler of the present invention. As shown in the drawing, the present invention provides an uninterruptible power/CATV signal coupler which comprises a base 100, a cover 300, a bridge connection device 200. The base 100 is provided with an accommodation chamber 110, a signal input end 102, and a signal output end 104. The signal input end 102 and the signal output end 104 are provided for connecting cables 400 (illustrated in FIG. 4). The cover 300 is detachably connected to the base 100. The cover 300 includes a circuit board 310, two sleeves 320, and a plurality of coupler connectors 330. The two sleeves 320 are connected to one side of the circuit board 310, and the coupler connectors 330 are connected to the other side of the circuit board 310.

Each of the sleeves 320 protrudes into the chamber 110. The circuit board 310 amplifies, passes or filters signals, and the amplified, passed or filtered signals are transmitted to paying subscribers via the coupler connectors 330.

Figure 2:
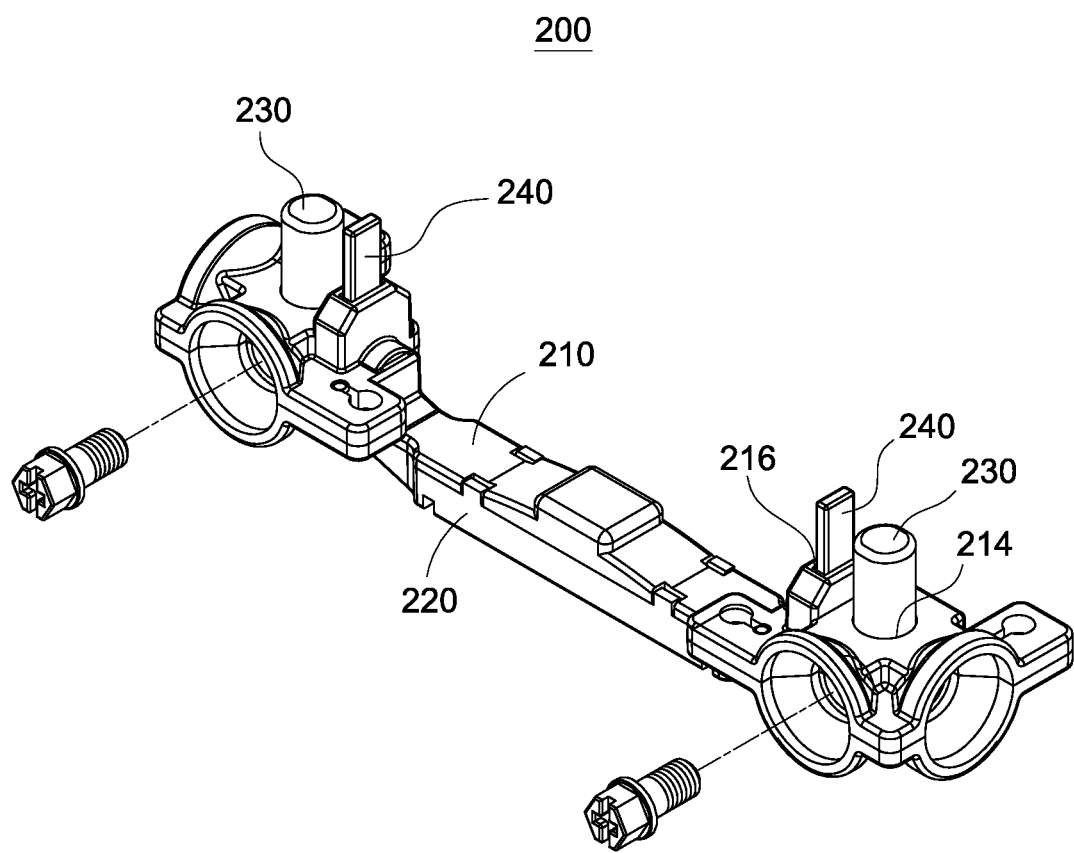
FIG. 2 is a perspective view of the present invention, illustrating a bridge connection device of the uninterruptible power/CATV signal coupler.
Figure 3:
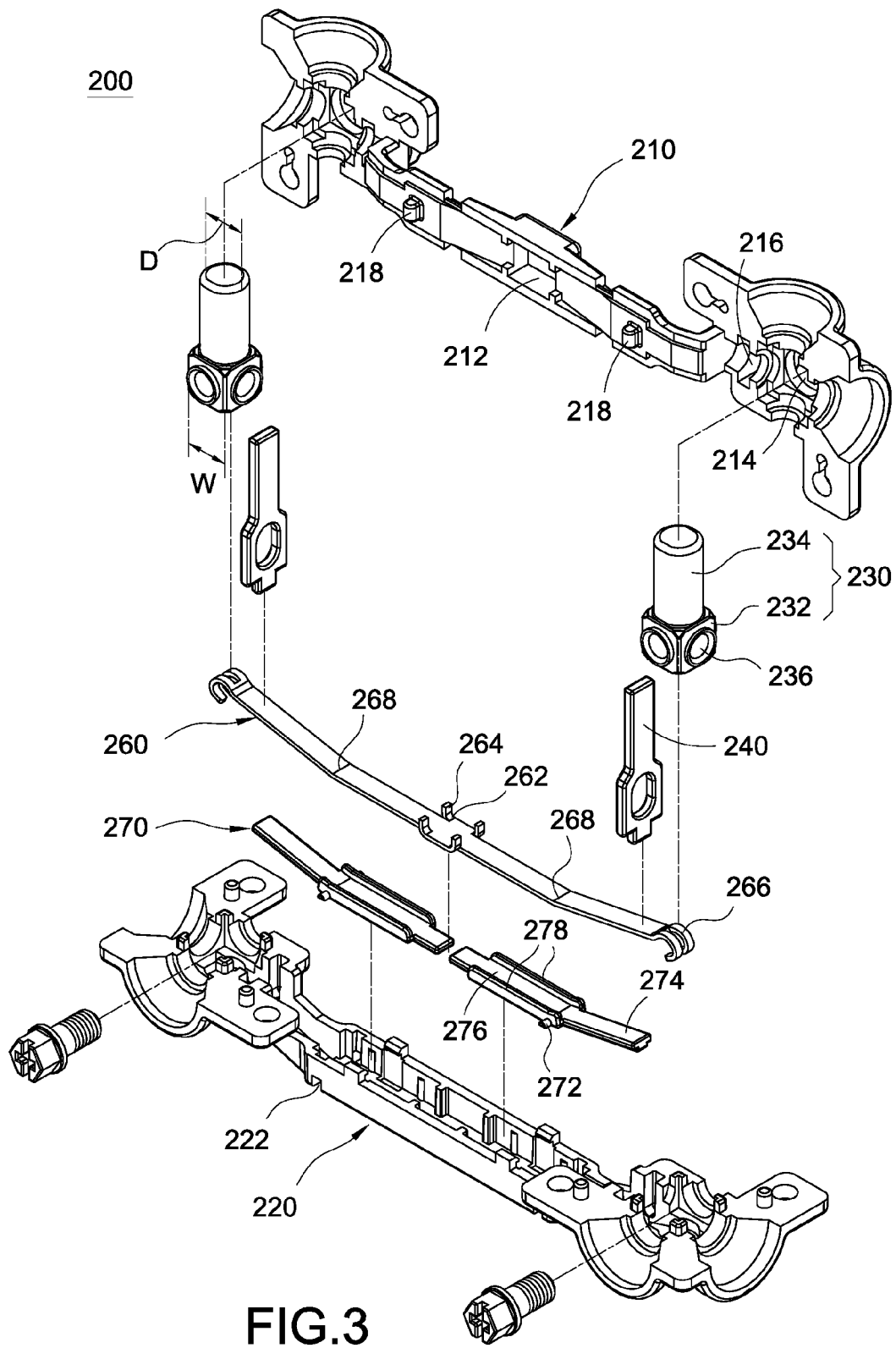
FIG. 3 is an exploded view of FIG. 2.

FIGS. 2 and 3 illustrate a perspective view and an exploded view of the bridge connection device of the present invention. The bridge connection device 200 is contained inside the accommodation chamber 110. The bridge connection device includes a first housing 210, a second housing 220 connected to the first housing 210, two conductive terminals 230 inserted into the two sleeves 320, two press elements 240 pressed by the circuit board 310, a bridge connection element 260 disposed between the first housing 210 and the second housing 220, and two seesaw elements 270 in contact with the bridge connection element 260. The two seesaw elements 270 are detachably pivotally connected to the second housing 220, and when two ends of the bridge connection element 260 are elastically pressed by the press elements 240, the bridge connection element is disconnected from the conductive terminals 230 and contacts the base 100.

Referring to FIG. 3, the bridge connection element 260 is preferably made of a material with good conductivity such as silver, copper or alloy thereof. The bridge connection element 260 further includes a plurality of claws 262 and two elastic portions 266. The elastic portions 266 are disposed at two ends of the bridge connection element 260 respectively for elastically contacting the base 100. That is to say, the second housing 220 includes an aperture (not illustrated), so that each of the elastic portions 266 and a portion of each seesaw element 270 can contact the base 100. Furthermore, each of the claws 262 is disposed between two elastic portions 266. The first housing 210 includes a retaining groove 212, and each of the claws 262 perpendicularly protrudes from an edge of the bridge connection element 260 and is disposed corresponding to the retaining groove 212. It is preferable that each of the claws 262 and the bridge connection element 260 are integrally formed, and an end of each of the claws 262 includes a bend portion 264 to direct the bridge connection element 260 to enter into or to be detached from the retaining groove 212.

Each seesaw element 270 further includes two pivot shafts 272, a tilt section 274, a flat section 276, and two flange plates 278. The second housing 220 includes two pivot holes 222, disposed corresponding to the two pivot shafts 272, for engaged with the pivot shafts 272. The tilt section 274 and the flat section 276 are disposed at two sides of the pivot shafts 272 respectively, and the tilt section 274 further tilts toward an end of the bridge connection element 260 from the pivot shaft 272. Each of the flange plates 278 is disposed upright at two sides of the flat section 276 for positioning the bridge connection element 260 (i.e. limiting the bridge connection element 260 from moving to the left or to the right). The bridge connection element 260 further includes two crease portions 268, and each of the crease portions 268 is disposed corresponding to the pivot shafts 272. In the embodiment shown in FIG. 3, the first housing 210 further includes two positioning pillars 218 disposed corresponding to the crease portions 268 of the bridge connection element 260 so as to further limit the bridge connection element 260 from moving between the seesaw elements 270 (i.e. where the pivot shaft 272 is) and the positioning pillars 218 (i.e. restricting upward or downward movement).

Figure 4:
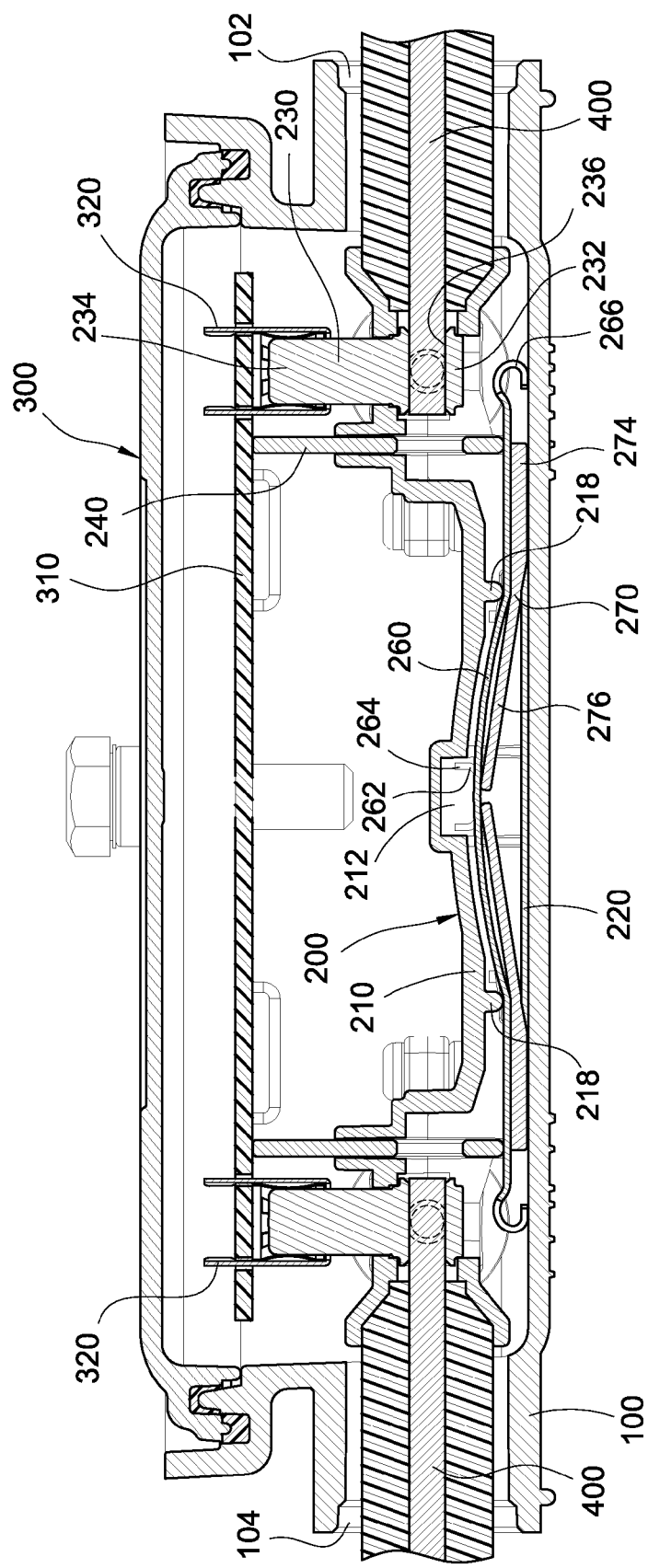
FIG. 4 is a side view of the present invention, illustrating a cover connected to (covering) a base.

Each of the two conductive terminals 230 further includes a linking portion 234 and a guiding pillar 232, the guiding pillar 232 is disposed between the first housing 210 and the second housing 220, and the linking portion 234 is engaged with the sleeve 320. A width W of the guiding pillar 232 is greater than a diameter D of the linking portion 234. A ratio of the diameter D of the linking portion 234 to the width W of the guiding pillar 232 is about 1:1.2 (1:1.33 is preferable), so that a radio frequency (RF) bandwidth ranges between 1.5 GHz to 2.0 GHz. The guiding pillar 232 further forms a plurality of through holes 236 for insertion of a cable 400 (as shown in FIG. 4). The first housing 210 includes two first openings 214 and two second openings 216. One end of each linking portion 234 passes through each opening 214, and one end of each press element 240 passes through each second opening 216, wherein each first opening 214 is closer to each side of the base 100 than each second opening 216.

Referring to FIG. 4, the cable 400 is connected to the signal input end 102 and the signal output end 104 and is inserted into the through holes 236 of the guiding pillars 232. By engaging the linking portion 234 with the sleeve 320, the signal is transmitted to the circuit board 310 to be passed, filtered or amplified and then be distributed to client devices (the paying subscribers). When the cover 300 covers the base 100, two ends 266 (i.e. two elastic portions) of the bridge connection element 260 are elastically pressed by the press elements 240, the bridge connection element 260 is disconnected from the guiding pillars 232 of the conductive terminals 230 and contacts the base 100. At this point, the tilt section 274 of the seesaw element 270 is pressed at the same time, the flat section 276 rotates about the pivot shaft 272 as an axis to tilt upward to push the bridge connection element 260 so that each of the claws 262 thereof protrudes into the retaining groove 212.

In other preferable embodiment, the bridge connection element 260 further includes two grounding portions (not illustrated) protruding corresponding to the base 100. Each of the grounding portions is disposed between the elastic portion 266 and the crease portion 268, so that the grounding portions can contact the surface of the base 100.

Figure 5:
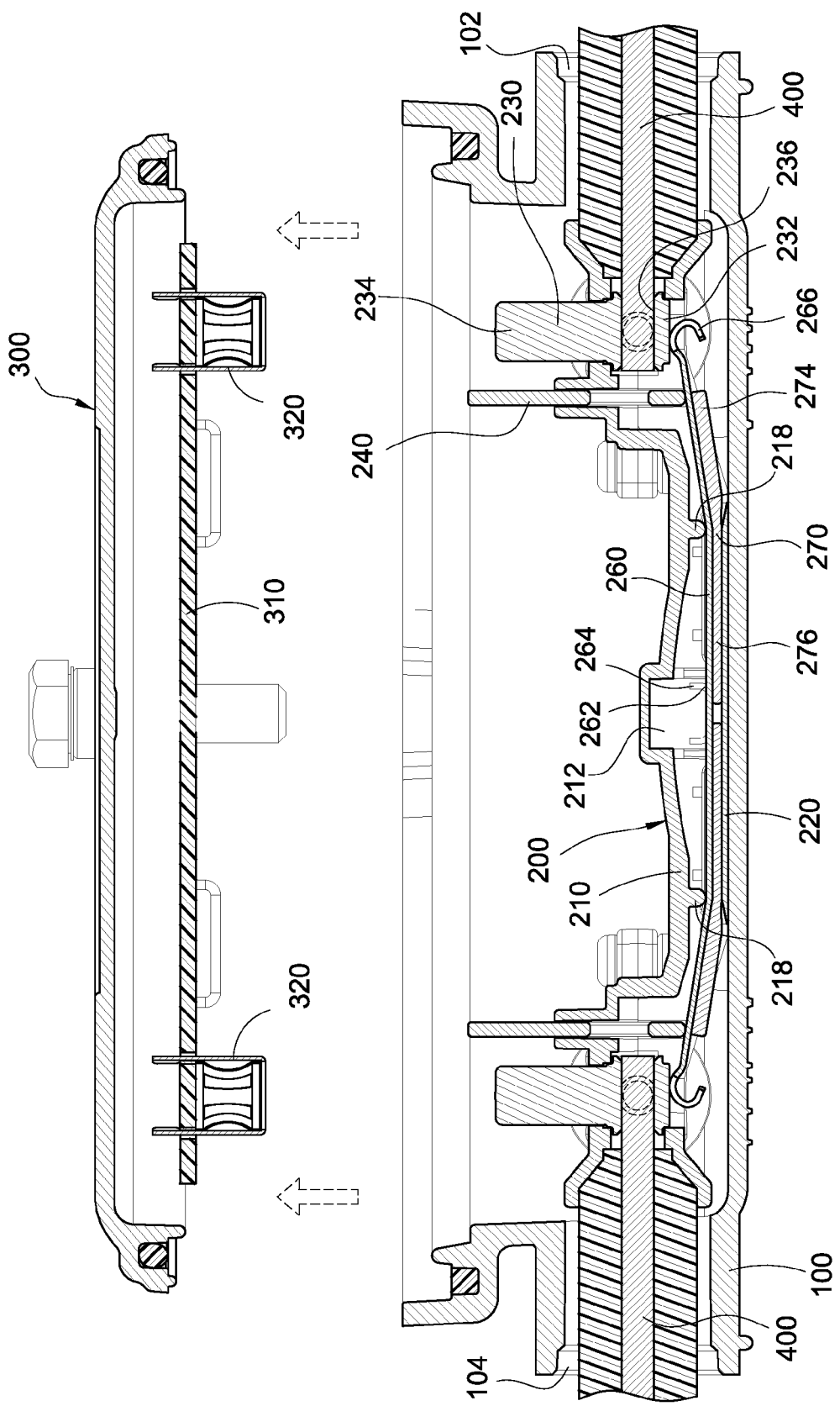
FIG. 5 is a side view of the present invention, illustrating the cover separated from the base.

When the cover 300 is detached from the base 100 for maintenance purpose, as shown in FIG. 5, the two ends of the bridge connection element 260 are detached from and not pressed by the press elements 240, so the two ends of the bridge connection element 260 are elastically restored to an original position so as to contact a bottom (the guiding pillar 232) of each of the conductive terminals 230 to make electrical connection. In other words, when the bridge connection element 260 is not pressed by the press element 240, the tilt section 274 of each seesaw element 270 tilts up because the bridge connection element 260 is restored to the original position, the flat section 276 rotates back about the pivot shaft as the axis to contact a surface of the second housing 220 of the bridge connection device 200, so each claw 262 of the bridge connection element 260 is detached from the retaining groove 212. Therefore, even though the cover 300 is opened, the bridge connection element 260 allows power/CATV signal transmission to continue without CATV signal/power supply interruption.

Figure 6:
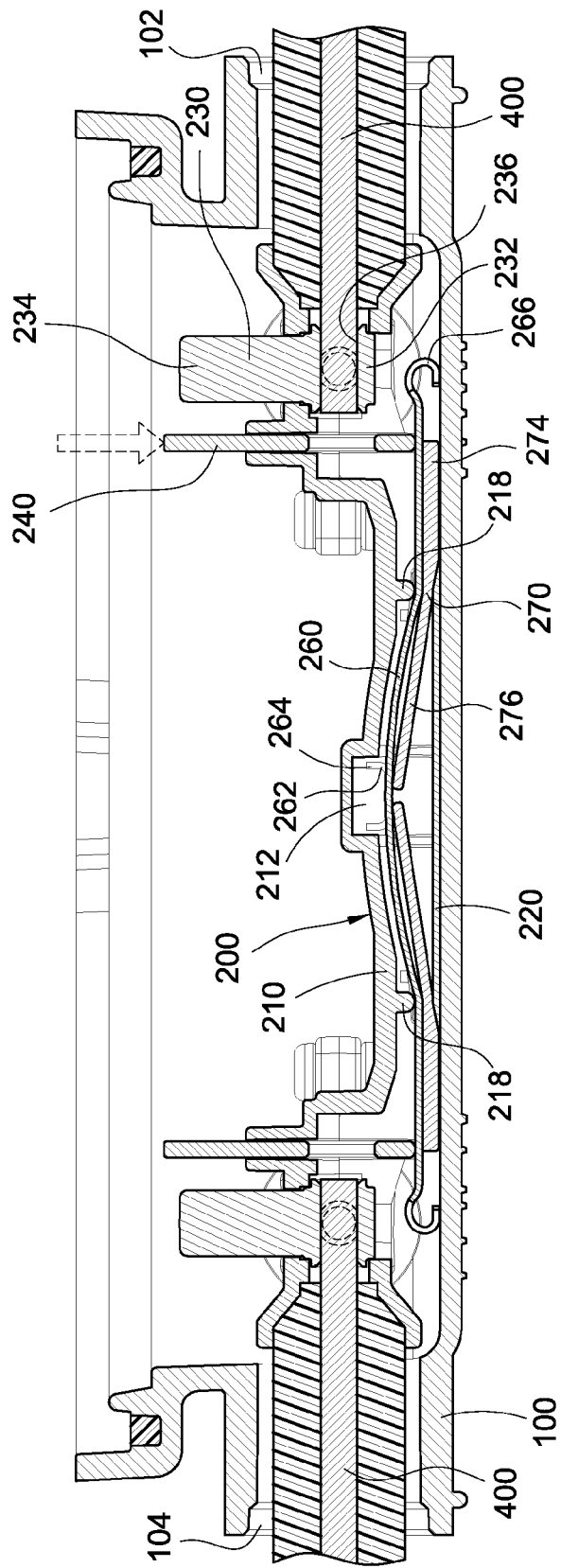
FIG. 6 is a schematic view of the present invention, illustrating pressing a press element of the uninterruptible power/CATV signal coupler.

It should be noted that, as shown in FIG. 6, when a maintenance staff presses one of the press elements 240, the tilt section 274 at one side is pressed by the press element 240, so that the flat section 276 rotates about the pivot shaft 272 as the axis to push the bridge connection element 260 to lift. At this point, owing to the shape change of the bridge connection element 260, the flat section 276 of the seesaw element 270 at the other side also lifts, and consequently, the tilt section 274 moves toward the base 100. Therefore, even though only the press element 240 at one side presses the bridge connection element 260, owing to the action of the seesaw element 270, the elastic portion 266 at the other side is detached from the conductive terminal (guiding pillar 232), so that both of the two ends (i.e. the elastic portions 266) of the bridge connection element 260 are detached form the conductive terminal (guiding pillar 232). That is to say, when pressing one side, the elastic portion 266 at this one side is detached from the conductive terminal (guiding pillar 232) to contact the base 100, and before contacting the base 100, the elastic portion 266 at the other side is detached from the conductive terminal (guiding pillar 232), thereby preventing a short circuit. Furthermore, when pressing one side, the elastic portion 266 at this one side is detached from the conductive terminal (guiding pillar 232) first to drive the elastic portion 266 at the other side to be detached from the conductive terminal (guiding pillar 232). In practice, this configuration only requires that when pressing the elastic portion 266 at one side to contact the base 100, the elastic portion 266 at the other side is detached from the conductive terminal (guiding pillar 232) to prevent a short circuit (however, the elastic portion 266 at the other side will still contact the base 100 in reality) in order to achieve convenient and time-saving maintenance.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. An uninterruptible power/CATV signal coupler, comprising:
   a base provided with an accommodation chamber;
   a cover detachably connected to the base, the cover including a circuit board and two sleeves, the sleeves being connected to one surface of the circuit board; and
   a bridge connection device contained inside the accommodation chamber, the bridge connection device including a first housing, a second housing connected to the first housing, two conductive terminals inserted into the two sleeves respectively, two press elements pressed by the circuit board, a bridge connection element disposed between the first housing and the second housing, and two seesaw elements in contact with the bridge connection element, wherein the two seesaw elements are detachably pivotally connected to the second housing, and when two ends of the bridge connection element are elastically pressed by the press elements, the bridge connection element is disconnected from the conductive terminals and contacts the base.

2. The uninterruptible power/CATV signal coupler of claim 1, wherein the bridge connection element further comprises a plurality of claws, the first housing includes a retaining groove, and each of the claws perpendicularly protrudes from an edge of the bridge connection element and is disposed corresponding to the retaining groove.

3. The uninterruptible power/CATV signal coupler of claim 2, wherein the bridge connection element further includes two elastic portions, the two elastic portions are disposed at two ends of the bridge connection element respectively for elastically contacting the base, and the claws are disposed between the two elastic elements.

4. The uninterruptible power/CATV signal coupler of claim 2, wherein each of the claws and the bridge connection element are integrally formed, and an end of each of the claws includes a bend portion.

5. The uninterruptible power/CATV signal coupler of claim 2, wherein each of the seesaw elements further includes two pivot shafts, a tilt section, and a flat section, the second housing includes two pivot holes disposed corresponding to the two pivot shafts for engagement with the two pivot shafts, the tilt section and the flat section are disposed at two sides of the pivot shafts respectively, and the tilt section further tilts toward the end of the bridge connection element from the pivot shaft.

6. The uninterruptible power/CATV signal coupler of claim 5, wherein the bridge connection element further includes two crease portions, the crease portions are disposed corresponding to the respective pivot shafts, when the bridge connection element is pressed by the press elements, the tilt section of the seesaw element is brought into a pressed position at the same time, the flat section rotates about the pivot shaft as an axis to tilt upward to push the bridge connection element so that each of the claws thereof protrudes into the retaining groove.

7. The uninterruptible power/CATV signal coupler of claim 5, wherein when the bridge connection element is not pressed by the press elements, the tilt section of the seesaw element tilts up upon elastic restoration of the bridge connection element to an original position, and the flat section rotates back about the pivot shaft as an axis to contact the second housing of the bridge connection device, thereby enabling each of the claws of the bridge connection element to be detached from the retaining groove.

8. The uninterruptible power/CATV signal coupler of claim 5, wherein the two seesaw elements further includes two flange plates respectively, each of the flange plates is disposed upright at two sides of the flat section for positioning the bridge connection element.

9. The uninterruptible power/CATV signal coupler of claim 3, wherein each of the two conductive terminals further includes a linking portion and a guiding pillar, the linking portion is disposed between the first housing and the second housing, the linking portion is engaged with the sleeve, a width of the guiding pillar is greater than a diameter of the linking portion, and the guiding pillar forms a plurality of through holes.

10. The uninterruptible power/CATV signal coupler of claim 3, wherein the bridge connection element further includes two grounding portions, each of the grounding portions is disposed between the elastic portion and the crease portion.

11. The uninterruptible power/CATV signal coupler of claim 9, wherein a ratio of the diameter of the linking portion to the width of the guiding pillar is about 1:1.2 (1:1.33 is preferable).

12. The uninterruptible power/CATV signal coupler of claim 1, wherein when the cover is detached from the base, the two ends of the bridge connection element are not pressed by the press elements, and the bridge connection element is elastically restored to an original position to contact a bottom of each of the two conductive terminals to make an electrical connection.

13. The uninterruptible power/CATV signal coupler of claim 9, wherein upon pressing one of the press elements at one side, the elastic element is disconnected from the guiding pillar to contact the base, and before contacting the base, the elastic element at the other side is also disconnected from the guiding pillar.

* * * * *